(12) United States Patent
Kim et al.

(10) Patent No.: US 12,541,952 B2
(45) Date of Patent: Feb. 3, 2026

(54) APPARATUS FOR COLLECTING A TRAINING IMAGE OF A DEEP LEARNING MODEL AND A METHOD FOR THE SAME

(71) Applicants: HYUNDAI MOTOR COMPANY, Seoul (KR); KIA CORPORATION, Seoul (KR)

(72) Inventors: Jin Sol Kim, Hwaseong-si (KR); Se Jeong Lee, Suwon-si (KR); Jung Woo Heo, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 495 days.

(21) Appl. No.: 18/132,183

(22) Filed: Apr. 7, 2023

(65) Prior Publication Data

US 2024/0169703 A1 May 23, 2024

(30) Foreign Application Priority Data

Nov. 18, 2022 (KR) ......................... 10-2022-0155702

(51) Int. Cl.
*G06V 10/774* (2022.01)
*G06V 10/764* (2022.01)
*G06V 10/778* (2022.01)
*G06V 10/94* (2022.01)
*G06V 20/56* (2022.01)

(52) U.S. Cl.
CPC .......... *G06V 10/774* (2022.01); *G06V 10/764* (2022.01); *G06V 10/778* (2022.01); *G06V 10/95* (2022.01); *G06V 20/56* (2022.01)

(58) Field of Classification Search
CPC .. G06V 10/774; G06V 10/778; G06V 10/764; G06V 20/56
See application file for complete search history.

(56) References Cited

U.S. PATENT DOCUMENTS

| | | | |
|---|---|---|---|
| 10,713,540 | B2 | 7/2020 | Zhang et al. |
| 11,386,674 | B2 | 7/2022 | Lee et al. |

(Continued)

FOREIGN PATENT DOCUMENTS

| | | | |
|---|---|---|---|
| KR | 20190089794 | A | 7/2019 |
| KR | 102075270 | B1 | 2/2020 |

(Continued)

OTHER PUBLICATIONS

Frank, Steven J., and Andrea M. Frank. "Salient slices: Improved neural network training and performance with image entropy." Neural Computation 32.6 (2020): 1222-1237. (Year: 2020).*

(Continued)

*Primary Examiner* — Raphael Schwartz
(74) *Attorney, Agent, or Firm* — Lempia Summerfield Katz LLC

(57) ABSTRACT

Provided are an apparatus for collecting a training image of a deep learning model and a method for the same. The apparatus may include a camera sensor configured to capture an image of a surrounding of a vehicle and a controller configured to determine an entropy of each pixel in the image. The controller may also be configured to determine an entropy of each class in the image based on the entropy of each pixel in the image and determine whether to collect the image based on the entropy of each class.

16 Claims, 6 Drawing Sheets

(56) References Cited

U.S. PATENT DOCUMENTS

| | | |
|---|---|---|
| 11,571,817 B2 | 2/2023 | Kim |
| 2020/0285866 A1 | 9/2020 | Lee et al. |
| 2021/0008726 A1 | 1/2021 | Kim |
| 2021/0271259 A1 | 9/2021 | Karpathy |
| 2022/0156524 A1 | 5/2022 | Alon et al. |

FOREIGN PATENT DOCUMENTS

| | | |
|---|---|---|
| KR | 102177880 B1 | 11/2020 |
| KR | 102313215 B1 | 10/2021 |

OTHER PUBLICATIONS

Holub, Alex, Pietro Perona, and Michael C. Burl. "Entropy-based active learning for object recognition." 2008 IEEE computer society conference on computer vision and pattern recognition workshops. IEEE, 2008. (Year: 2008).*

Song, Yan, et al. "Entropy-based training data selection for domain adaptation." Proceedings of COLING 2012: Posters. 2012. (Year: 2012).*

* cited by examiner

APPARATUS FOR COLLECTING A TRAINING IMAGE OF A DEEP LEARNING MODEL AND A METHOD FOR THE SAME

CROSS-REFERENCE TO RELATED APPLICATION

This application claims the benefit of and priority to Korean Patent Application No. 10-2022-0155702, filed on Nov. 18, 2022, the entire contents of which are incorporated herein by reference.

TECHNICAL FIELD

The present disclosure relates to a technology of stably collecting a training image for improving the performance of a deep learning model.

BACKGROUND

In the field of artificial intelligence, an artificial neural network (ANN) is an algorithm that allows a machine to simulate and learn the human neural structure. Recently, ANNs have been applied to image recognition, speed recognition, natural language processing, and the like and have shown excellent results. The ANN is composed of an input layer for receiving an input, a hidden layer for performing learning, and an output layer for returning a result of calculation. A plurality of hidden layers are referred to as a deep neural network (DNN). The DNN is a type of ANN.

The ANN allows a computer to perform self-learning based on data. When a certain problem is solved using the ANN, an appropriate ANN model and data to be analyzed needs to be prepared. An ANN model for solving a problem is trained based on data. Prior to learning the model, there is required work for appropriately processing the data. This is because the ANN model requires typical input data and typical output data. Accordingly, the obtained raw data needs to be preprocessed appropriately to generate required input data. After preprocessing, the processed data needs to be divided into two types of data. In particular, the data is divided into a training dataset and a validation dataset. The training dataset is used to train a model, and the validation dataset is used to validate the performance of the model.

There are several reasons for validating an ANN model. An ANN developer may correct a hyper parameter of the model based on the result of validating the model to tune the model. Furthermore, the model may be validated to select which model is suitable among several models. In more detail, several reasons for why model validation is necessary are as follows.

First, it is to predict accuracy. The purpose of the ANN is to achieve good performance on out-of-sample data which is not used for training. Therefore, after creating the model, it is essential to verify how well the model will perform on out-of-sample data. Because the model should not be validated using the training dataset, accuracy of the model should be measured using the validation dataset independent of the training dataset.

Secondly, the model is turned to enhance performance of the model. For example, overfitting may be prevented. Overfitting occurs when the model is overtrained on the training dataset. As an example, when training accuracy is high and when validation accuracy is low, the possibility of overfitting may be suspected. This may be identified in detail by means of a training loss and a validation loss. When overfitting occurs, it should be prevented to enhance accuracy of validation. Overfitting may be prevented using a method such as regularization and dropout.

Generally, an existing technology, which predicts a path of a vehicle which travels on the road, simply predicts a driving path of a target vehicle based on shape information of the road and driving information of the target vehicle, without regard to correlations among respective vehicles which travel on the road. Therefore, the existing technology does not predict the driving path of the target vehicle with high accuracy.

According to a conventional technology of collecting the training image, a user has to personally set a specific condition of collecting the training image, and the training image is collected only under the set condition. Accordingly, a significant amount of time is spent when the user sets the specific condition. Moreover, the training image may not be collected under a condition (not defined) that is not included in the specific condition.

As such, the performance of the deep learning model cannot be improved with respect to the training image collected under the specific condition. Thus, when the deep learning model is applied to the autonomous driving vehicle, the safety of the occupant may be unsecured.

The foregoing is intended to merely aid in the understanding of the background of the present disclosure, and is not intended to mean that the statements in this section fall within the purview of an existing technology well known to those having ordinary skill in the art.

SUMMARY

The present disclosure has been made to solve the above-mentioned problems occurring in the prior art while advantages achieved by the prior art are maintained intact.

An embodiment of the present disclosure provides an apparatus for collecting a training image of a deep learning model and a method for the same. An image is acquired from a camera sensor provided in a vehicle, and the entropy of each pixel in the image is determined. For example, the entropy in each class in the image is determined based on the entropy of each pixel in the image. When the entropy in each class satisfies a preset range, the image is collected as the training image of the deep learning model. Accordingly, the user may stably collect a training image to improve the performance of the deep learning model, without individually selecting the collecting condition.

In addition, embodiments of the present disclosure store the collected training images in a memory, and maintain a maximum number of the training images stored in the memory based on a priority of the training images, such that optimal training images are collected to improve the performance of the deep learning model.

Further, embodiments of the present disclosure periodically (for example, with a time interval of 30 days) transmit training images, which are stored in the memory, to an external learning server in a start-off state of a vehicle, thereby providing, to the external learning server, the training images to improve the performance of the deep learning model without the influence on the autonomous driving function of the vehicle.

The technical problems to be solved by the present disclosure are not limited to the aforementioned problems, and other technical problems not mentioned herein should be clearly understood from the following description by those having ordinary skill in the art to which the present disclosure pertains. In addition, it can be easily understood that the objects and the features of the present disclosure are realized by means and the combination of the means claimed in appended claims.

According to an embodiment of the present disclosure, an apparatus for collecting a training image of a deep learning model may include a camera sensor configured to capture an image of a surrounding of a vehicle, and a controller configured to determine an entropy of each pixel in the image. The controller may also be configured to determine an entropy of each class in the image based on the entropy of each pixel in the image and determine whether to collect the image based on the entropy of each class.

According to an aspect, the controller may determine pixels constituting a first class in the image, and determine, as entropy of the first class, an entropy average of pixels constituting the first class.

According to an aspect, the controller may collect the image as a training image of the deep learning model when all entropy of each class satisfies a preset range.

According to an aspect, the controller may determine a priority of the training images collected and may store a preset number of training images in a storage based on the priority.

According to an aspect, the controller may determine an entropy average of each class included in each training image and may assign a highest priority to a training image having a highest entropy average.

According to an aspect, the controller may determine an entropy of a specific class among classes included in each training image. The controller may assign a highest priority to a training image having a highest entropy of the specific class.

According to an aspect, the controller may determine, when training images are additionally collected in a state that the preset number of training images are stored in a storage, the preset number of training images in a higher priority order with respect to the training images stored and the training images additionally collected.

According to an aspect, the controller may substitute the preset number of training images stored in the storage with the preset number of training images determined.

According to an aspect, the controller may periodically transmit, to a wireless communication device in a start-off state of the vehicle, the training images stored in the storage.

According to an aspect, the controller may transmit, to the wireless communication device in a start-on state of the vehicle, a message for requesting to prepare for receiving the training images. The controller may further receive, from the wireless communication device in a start-off state of the vehicle, a message for indicating that preparing for receiving the training images is completed.

According to another embodiment of the present disclosure, a method for collecting a training image of a deep learning model may include taking, by a camera sensor, an image of a surrounding of a vehicle. The method may also include determining, by a controller, an entropy of each pixel in the image and determining, by the controller, an entropy of each class in the image based on the entropy of each pixel in the image. The method may further include determining, by the controller, whether to collect the image based on the entropy of each class.

According to an aspect, determining the entropy of each class in the image includes determining pixels constituting a first class in the image, and determining, as entropy of the first class, an entropy average of pixels constituting the first class.

According to an aspect, determining whether to collect the image may include collecting the image as the training image of the deep learning model when the entropy of each class satisfies the preset range.

According to an aspect, determining whether to collect the image may include determining a priority of the training images collected and storing a preset number of training images in a storage based on the priority.

According to an aspect, determining the priority of the training images collected may include determining an entropy average of each class included in each training image and assigning a highest priority to a training image having a highest entropy average.

According to an aspect, determining the priority of the training images collected may include determining an entropy of a specific class among classes included in each training image and assigning a highest priority to a training image having a highest entropy of the specific class.

According to an aspect, storing the preset number of training images may further include determining, when training images are additionally collected in a state that the preset number of training images are stored in the storage, the preset number of training images in a higher priority order with respect to the training images stored and the training images additionally collected and substituting the preset number of training images stored in the storage with the preset number of training images determined.

According to an aspect, determining whether to collect the image may further include: transmitting, to a wireless communication device in a start-on state of the vehicle, a message for requesting to prepare for receiving the training images, receiving, from the wireless communication device in a start-off state of the vehicle, a message for indicating that preparing for receiving the training images is completed, and periodically transmitting, to the wireless communication device in a start-off state of the vehicle, the training images stored in the storage.

The technical problems to be solved by the present disclosure are not limited to the aforementioned problems, and other technical problems not mentioned herein should be clearly understood from the following description by those having ordinary skill in the art to which the present disclosure pertains.

BRIEF DESCRIPTION OF THE DRAWINGS

The above and other objects, features and advantages of the present disclosure should be more apparent from the following detailed description taken in conjunction with the accompanying drawings, in which.

DETAILED DESCRIPTION

Hereinafter, embodiments of the present disclosure are described in detail with reference to the accompanying drawings. In the accompanying drawings, identical or equivalent components are designated by the identical numeral even when they are displayed in different drawings. Further, in describing the embodiments of the present disclosure, where it has been considered that a specific description of well-known features or functions may obscure the gist of the present disclosure, a detailed description thereof has been omitted.

In the following description of components according to embodiments of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings equal to the contextual meanings in the relevant field of art, and should not be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or perform that operation or function.

Figure 1:
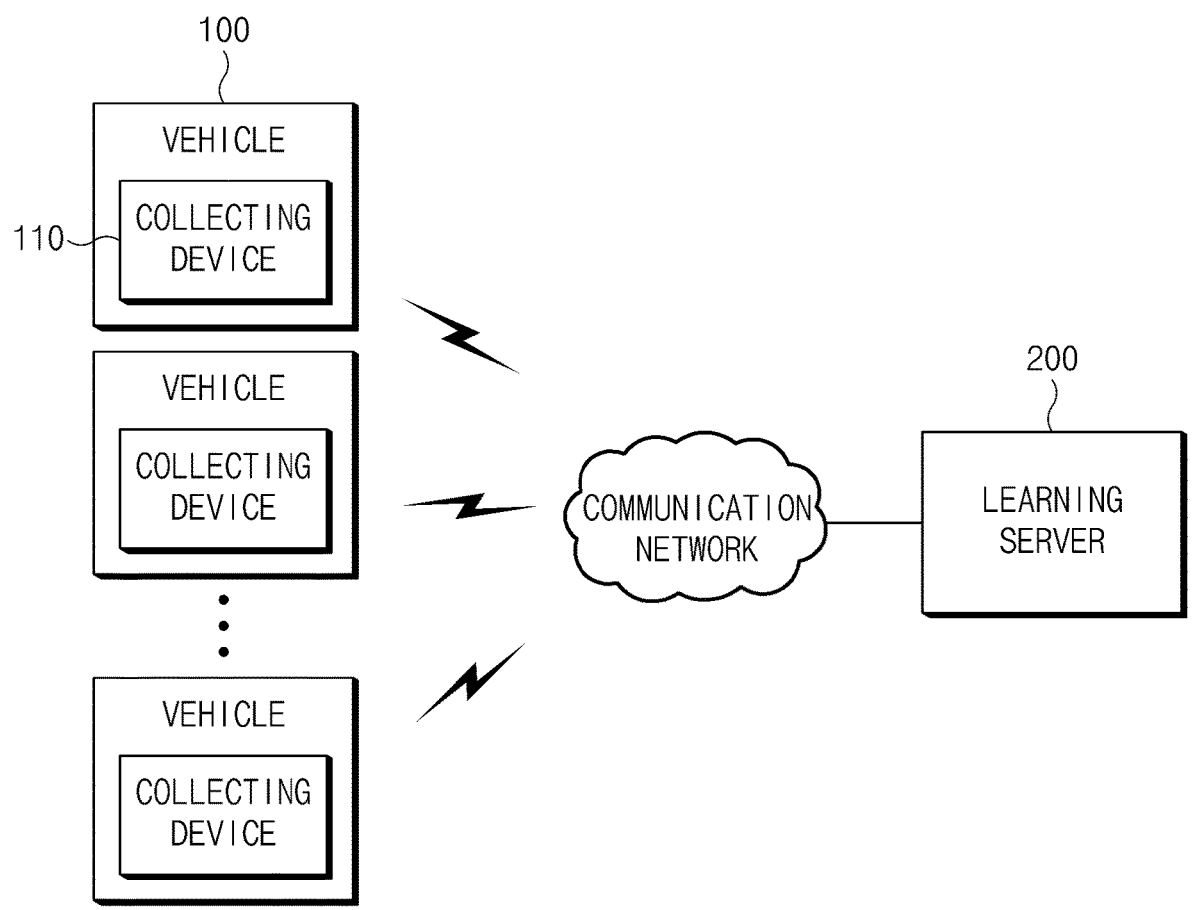
FIG. 1 is a view illustrating the configuration of a system for collecting a training image of a deep learning model, according to an embodiment of the present disclosure.

FIG. 1 is a view illustrating an example configuration of a system for collecting a training image of a deep learning model, according to an embodiment of the present disclosure.

As illustrated in FIG. 1, the system for collecting the training image of the deep learning model according to an embodiment of the present disclosure may include a plurality of vehicles 100 and a learning server 200.

The vehicle 100 may include a collecting device 110 for collecting the training image of the deep learning model. The collecting device 110 may acquire an image from a camera sensor 20 provided in the vehicle 100, determine an entropy of each pixel in the image, determine an entropy of each class in the image based on the entropy of the each pixel in the image, and collect the image as the training image when all entropy of the each class satisfies a preset range.

The learning server 200 may train the deep learning model by using various training images collected by the plurality of vehicles 100. The various training images may be optimal training images to improve the performance of the deep learning model.

Figure 2:
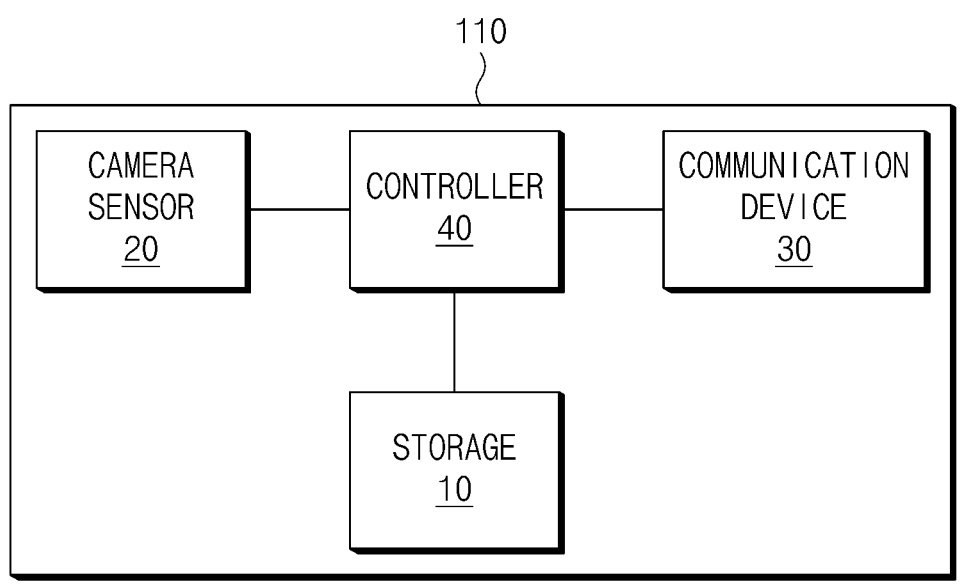
FIG. 2 is a view illustrating the configuration of an apparatus for collecting a training image of a deep learning model, according to an embodiment of the present disclosure.

FIG. 2 is a view illustrating an example configuration of an apparatus for collecting a training image of a deep learning model, according to an embodiment of the present disclosure.

As illustrated in FIG. 2, according to an embodiment of the present disclosure, an apparatus 110 for collecting the training image of the deep learning model may include a storage 10 the camera sensor 20, a communication device 30, and a controller 40. According to some embodiments, the components of the apparatus 110 may be combined with one another to be implemented in one form, or some components may be omitted, depending on the manners of collecting the training image of the deep learning model.

The storage 10 may store various logic, algorithms, and programs required in the processes of acquiring an image from the camera sensor 20 provided in the vehicle 100, determining entropy of each pixel in the image, determining entropy of each class in the image based on the entropy of the each pixel in the image, and collecting the image as the training image when all entropy of the each class satisfies a preset range. Case in an embodiment, the storage 10 may store the deep learning model used for determining entropy of each pixel in the image, and determining entropy of each class in the image.

In addition, the storage 10 may store various logic, algorithms, and programs required in the processes of determining the priority of training images collected, and storing a preset number of training images based on the priority.

Additionally or alternatively, the storage 10 may store various logic, algorithms, and programs required in the processes of determining, when training images are additionally collected in a state that the preset number of training images are stored, the preset number of training images in a higher priority order with respect to the training images stored and the training images additionally collected.

In addition, the storage 10 may store various logic, algorithms, and programs required in the processes of periodically transmitting, to a wireless communication device provided in the vehicle 100, the training images previously stored in the storage, in a start-off state of the vehicle 100.

The storage 10 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The camera sensor 20 may capture images of a front portion, a rear portion, a left portion, and a right portion of the vehicle 100. Accordingly, the camera sensor 20 may include a front camera, a rear camera, a left camera, and a right camera.

The communication device 30 may comprise a module configured to provide a communication interface with the wireless communication device provided in the vehicle 100. The communication device 30 may transmit the training image stored in the storage 10 to the wireless communication device provided in the vehicle 100. The wireless communication device may include at least one of a mobile communication module, a wireless Internet module, or a short-range wireless communication module.

The mobile communication module may make communication with the learning server 200 over a mobile communication network constructed depending on technology standards or communication schemes for mobile communication. For example, the technology standards or communication schemes for mobile communication may include Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), or Long Term Evolution-Advanced (LTEA).

The wireless Internet module, which is a module for wireless Internet access, may make communication with the learning server 200 through Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), or Long Term Evolution-Advanced (LTE-A).

The short-range communication module may support short-range communication with the learning server 200 through at least one of Bluetooth™, Radio Frequency Identification (RFID), Infrared Data Association (IrDA), Ultra Wideband (UWB), ZigBee, Near Field Communication (NFC), or Wireless Universal Serial Bus (USB).

The controller 40 may perform the overall control such that the components of the apparatus 110 may perform the respective functions. The controller 40 may be implemented in the form of hardware or software, and may be implemented in the form of the combination of the hardware and the software. In an embodiment, the controller 40 may be implemented with a micro-processor, but the present disclosure is not limited thereto.

In various embodiments, the controller 40 may perform various control operations in the processes of acquiring an image from the camera sensor 20, determining entropy of each pixel in the image, determining entropy of each class in the image based on the entropy of the each pixel in the image, and collecting the image as the training image when all entropy of the each class satisfies a preset range.

In addition, the controller 40 may perform various control operations in the processes of determining the priority of training images collected, and storing the preset number of training images, based on the priority.

Additionally or alternatively, the controller 40 may perform various control operations in the processes of determining, when training images are additionally collected in a state that the preset number of training images are stored in the storage 10, the preset number of training images in a higher priority order with respect to the training images stored and the training images additionally collected.

In addition, the controller 40 may perform various control operations in the processes of periodically transmitting, to a wireless communication device provided in the vehicle 100, the training images previously stored in the storage, in a start-off state of the vehicle.

Hereinafter, the operation of the controller 40 is described in more detail with reference to FIGS. 3 and 4.

Figure 3:
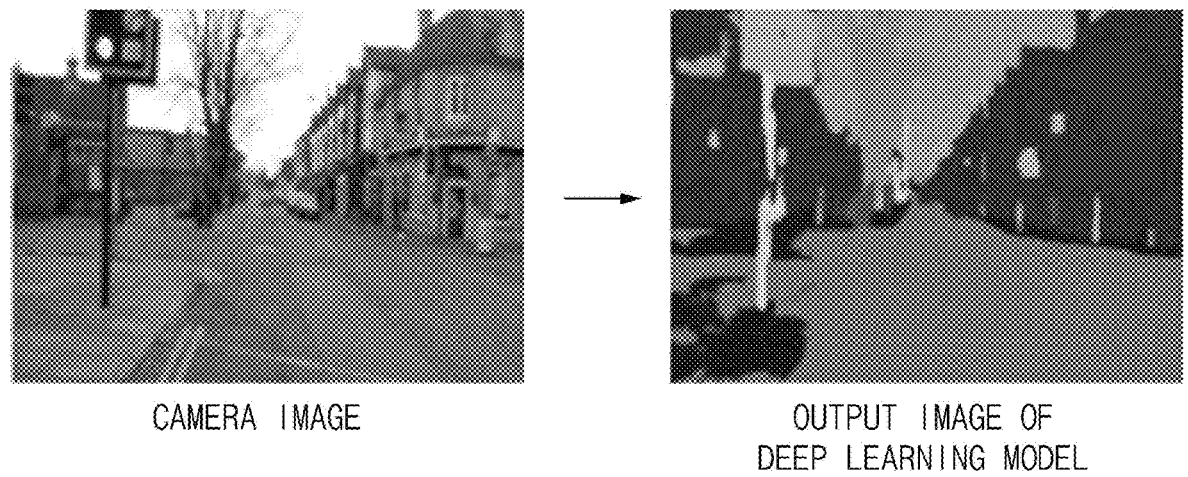
FIG. 3 is a view illustrating an output image of a deep learning model in an apparatus for collecting a training image of a deep learning model, according to an embodiment of the present disclosure.

FIG. 3 is a view illustrating an output image of a deep learning model in an apparatus for collecting a training image of a deep learning model, according to an embodiment of the present disclosure.

As illustrated in FIG. 3, the controller 40 may acquire the output image of the deep learning model by inputting a camera image into the deep learning model. In an embodiment, the output image of the deep learning model may be an object recognition image.

It may be recognized that each class (object) in the output image may refer to a road, a building, a traffic light, or a tree, and each class is expressed in the different shade (or color), in the output image of the deep learning model. In other words, pixels classified into the same class are expressed in the same shade (or color).

For example, when the height is 100 and the width is 100 in the dimension (the number of pixels) of the output image of the deep learning model, the number of classes in the output image of the deep learning model is 5, the probability of a first class is 0.1, the probability of a second class is 0.1, the probability of a third class is 0.4, the probability of a fourth class is 0, and the probability of a fifth class is 0.8 at coordinates (1,1) in the output image of the deep learning model, the coordinates (1,1) may be recognized as the fifth class.

Accordingly, the output image of the deep learning model may include information on each class for each pixel. For example, the output image of the deep learning model may include, as information on the coordinates (1,1), '0.1' serving as the probability of the first class, '0.1' serving as the probability of the second class, '0' serving as the probability of the third class, '0' serving as the probability of the fourth class, and '0.8' serving as the probability of the fifth class.

Figure 4:
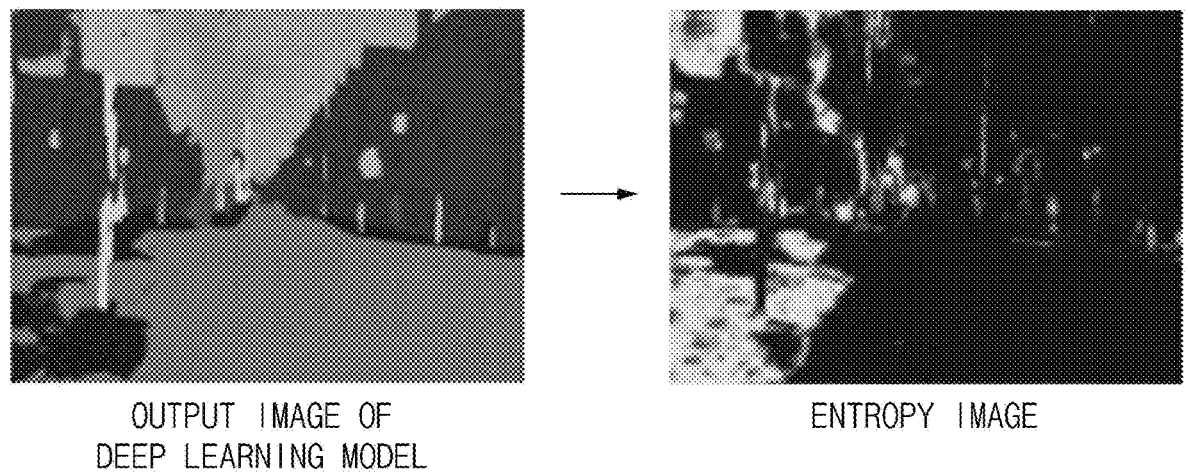
FIG. 4 is a view illustrating the process of determining the entropy of each pixel by using an output image of a deep learning model by a controller provided in an apparatus for collecting a training image of a deep learning model, according to an embodiment of the present disclosure.

FIG. 4 is a view illustrating the process of determining of entropy of each pixel by using the output image of the deep learning model by a controller provided in an apparatus for collecting a training image of a deep learning model according to an embodiment of the present disclosure.

As illustrated in FIG. 4, the controller 40 may generate an entropy image from the output image of the deep learning model. For example, the controller 40 may determine the entropy ($E^{(h,w)}$) of each pixel in the output image of the deep learning model based on the following Equation 1.

$$E^{(h,w)} = \sum_{c=1}^{C} p^{(h,w)}(c) \log\left(p^{(h,w)}(c)\right) \quad \text{Equation 1}$$

In Equation 1, 'h' denotes pixel coordinates of an output image of a deep learning model, 'w' denotes width pixel coordinates of an output image of the deep learning model, and 'c' denotes the number of classes included in the output image of the deep learning model. In addition, 'p' denotes the probability value, and $p^{(h,w)}$ denotes the probability of a (h,w)-th pixel.

The controller 40 may determine the entropy of each pixel in the output image of the deep learning model based on Equation 1, and may determine the entropy of each class based on the entropy of each pixel. For example, when whole pixels are 'A', 'B', 'C', 'D', and 'E', the entropy of 'A' is 0.2, the entropy of 'B' is 0.6, the entropy of 'C' is 0.4, the entropy of 'D' is 0.1, and the entropy of 'E' is 0.5, and pixels constituting the first class are 'A', 'B', and 'C', the controller 40 may determine an average (0.4) of the entropy of 'A', the entropy of 'B', and the entropy of 'C' as the entropy of the first class. For another example, the controller 40 may determine the entropy of the first class only by using the entropy, which exceeds a threshold value (e.g., 0.3), among the entropy of 'A', the entropy of 'B', and the entropy of 'C'. In this example, the entropy of the first class becomes '0.5'.

The controller 40 may determine the entropy of each class based on following Equation 2.

$$E_k = \sum_{h=1}^{H}\sum_{w=1}^{W}\sum_{c=1}^{C} p^{(h,w)}(c)\log(p^{(h,w)}(c)) \quad \text{Equation 2}$$

-continued $$\overline{E_k} = \frac{E_k}{\#\operatorname{argmax}_c(p^{(h,w)}(c)) = k} \quad \text{if } \operatorname{argmax}_c(p^{(h,w)}(c)) = k$$

In Equation 2, $\overline{E_k}$ denotes the entropy of each class, $E_k$ denotes the total entropy of pixels constituting a class of 'k', 'h' denotes height pixel coordinates of the output image of the deep learning model, 'w' denotes width pixel coordinates of the output image of the deep learning model, and 'c' denotes the number of classes included in the output image of the deep learning model. In addition, 'p' denotes the probability, and $p^{(h,w)}$ denotes the probability of the (h,w)-th pixel.

The controller 40 may collect the image as the training image of the deep learning mode when the entropy (Class_E) of all classes in the image is included in a present range (E_lower_limit<Class_E<E_upper_limit). In this case, when the entropy of at least one class in the image is equal to or less than "E_lower_limit', the image does not exert an influence on improving the performance of the deep learning model. Accordingly, the image does not need to be collected. In addition, when the entropy of at least one class in the image is greater than or equal to 'E_upper_limit', the image does not need to be collected, because the vehicle 100 is not driving on a general road.

In some embodiments, the controller 40 may determine the priority of the training images collected. For example, the controller 40 may determine an entropy average of each class included in each training image and assign a highest priority to a training image having a highest entropy average.

For example, when the first training image contains classes 'A', 'B', and 'C', the second training image contains classes 'D' and 'E', the entropy of class 'A' is 0.8, the entropy of class 'B' is 0.5, the entropy of class 'C' is 0.5, the entropy of class 'D' is 0.8, and the entropy of class 'E' is 0.6, the entropy average of each class of the first image is 0.6, and the entropy average of each class of the second image is 0.7. Accordingly, the controller 40 may set the priority of the second image to be higher than the priority of the first image.

As another example, the controller 40 may determine an entropy of a specific class among classes included in each training image and assign a highest priority to a training image having a highest entropy of the specific class.

The controller 40 may maintain the preset number of training images stored in the storage 10 based on the priority. For example, the controller 40 may determine, when training images are additionally collected in a state that the preset number of training images are stored in the storage 10, the preset number of training images in a higher priority order with respect to the training images stored in the storage 10 and the training images additionally collected, and substitute the preset number of training images stored in the storage 10 with the preset number of training images determined.

The controller 40 may transmit the preset number of training images stored in the storage 10 to the wireless communication device provided in the vehicle 100, in a start-off state of the vehicle 100, when a transmission condition is satisfied in a start-on state of the vehicle 100. The transmission condition may be, for example, that the preset number of training images are stored in the storage 10 and a transmission period (for example, the time interval of 30 days) is reached.

In an embodiment, in the process of transmitting training images stored in the storage 10 to the wireless communication device provided in the vehicle, the controller 40 may transmit a message for requesting to prepare for receiving the training images to the wireless communication device when the transmission condition is satisfied in the start-on state of the vehicle 100. The controller 40 may then start to transmit the training images in response to receiving, from the wireless communication device, a message indicating that the preparing for receiving the training image is completed, in a start-off state of the vehicle 100. In an embodiment, the wireless communication device may transmit, to the controller 40, an ACK message, whenever normally receiving each training image.

Figure 5:
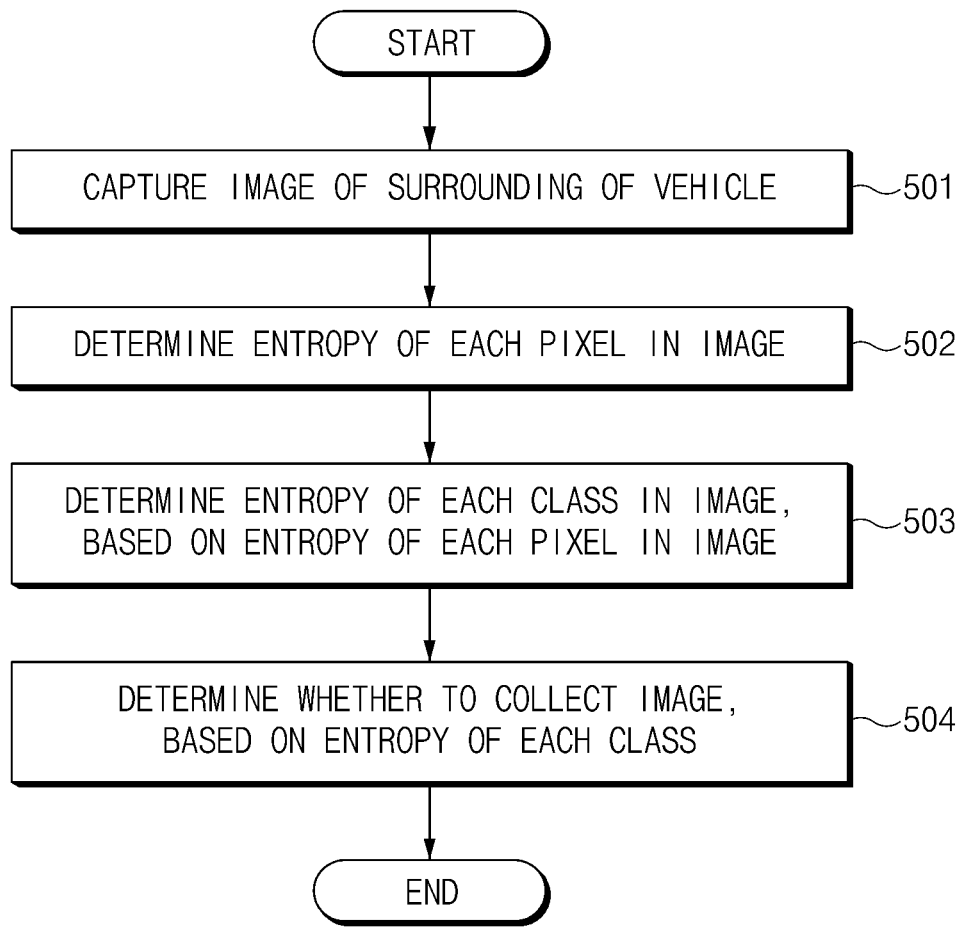
FIG. 5 is a flow chart illustrating a method for collecting a training image of a deep learning model, according to an embodiment of the present disclosure.

FIG. 5 is a flow chart illustrating a method for collecting a training image of a deep learning model, according to an embodiment of the present disclosure.

In operation 501, the camera sensor 20 captures an image of a surrounding of a vehicle.

In operation 502, the controller 40 determines entropy of each pixel in the image.

In operation 503, the controller 40 determines the entropy of each class in the image, based on the entropy of each pixel in the image.

In operation 504, the controller 40 determines whether to collect the image, based on the entropy of the each class.

Figure 6:
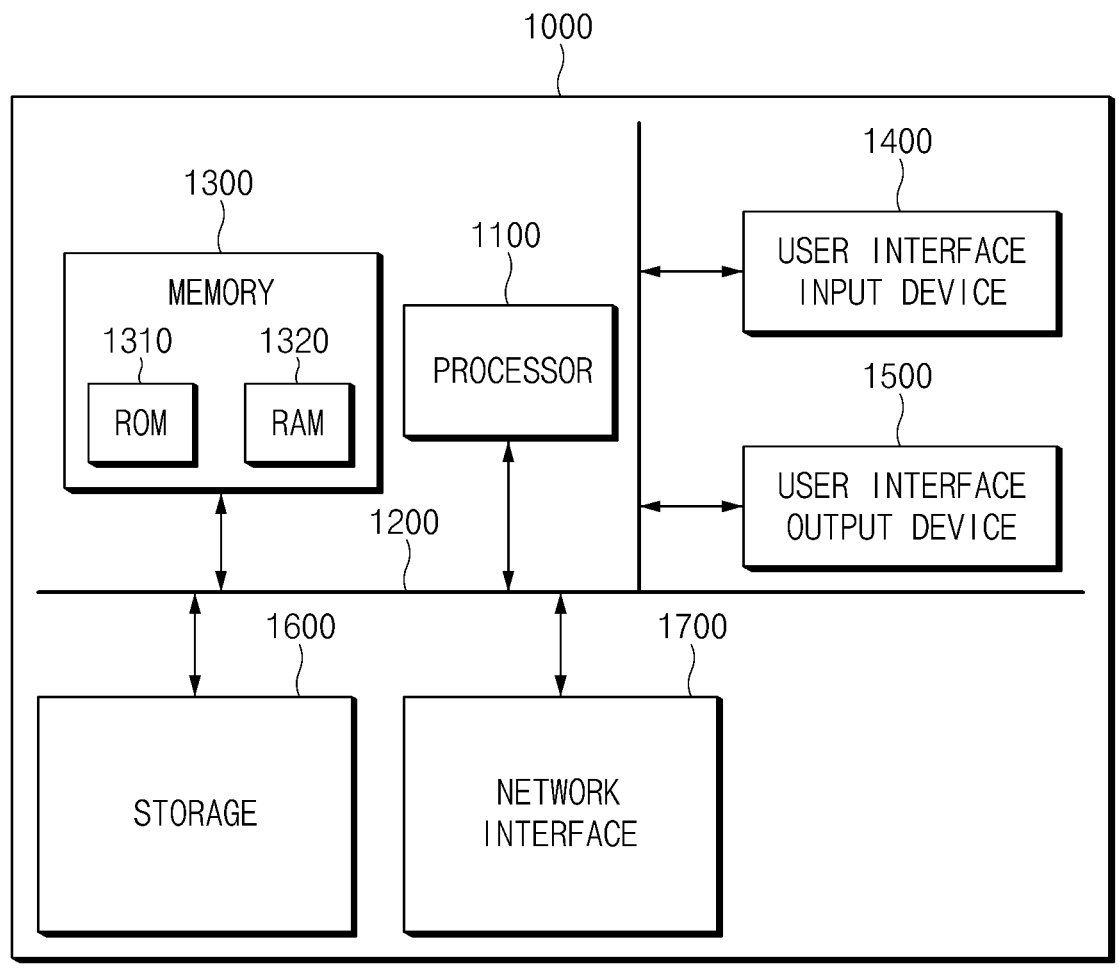
FIG. 6 is a block diagram illustrating a computing system to execute a method for collecting a training image of a deep learning model, according to an embodiment of the present disclosure.

FIG. 6 is a block diagram illustrating a computing system to execute a method for collecting a training image of a deep learning model, according to an embodiment of the present disclosure.

Referring to FIG. 6, according to an embodiment of the present disclosure, the method for collecting the training image of the deep learning mode may be implemented by a computing system 1000. The computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

In various embodiments, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to embodiments of the present disclosure, in an apparatus for collecting a training image of a deep learning model and a method for the same, an image may be acquired from a camera sensor provided in a vehicle and the entropy of each pixel in the image may be determined. For example, the entropy in each class in the image may be determined based on the entropy of each pixel in the image. When the entropy in each class satisfies a preset range, the image is collected as the training image of the deep learning model. Accordingly, the user may stably collect a training image to improve the performance of the deep learning model, without individually selecting the collecting condition.

In addition, according to embodiments of the present disclosure, in the apparatus for collecting the training image of the deep learning model and the method for the same, the collected training images are stored in a memory, and the maximum number of the training images stored in the memory based on a priority of the training images is maintained, such that the optimal training images are collected to improve the performance of the deep learning model.

In addition, according to embodiments of the present disclosure, in the apparatus for collecting the training image of the deep learning model and the method for the same, training images, which are stored in the memory, may be periodically transmitted to an external learning server in the start-off state of the vehicle, thereby improving the performance of the deep learning model without the influence on the autonomous driving function of the vehicle.

The above description is merely an example of the technical idea of the present disclosure, and various modifications and modifications may be made by one having ordinary skill in the art without departing from the essential characteristics of the disclosed concepts.

Accordingly, embodiments of the present disclosure are intended not to limit but to explain the technical idea of the present disclosure, and the scope and spirit of the disclosure is not limited by the above embodiments. The scope of protection of the present disclosure should be construed by the attached claims, and all equivalents thereof should be construed as being included within the scope of the present disclosure.

Hereinabove, although the present disclosure has been described with reference to example embodiments and the accompanying drawings, the present disclosure is not limited thereto, but may be variously modified and altered by those having ordinary skill in the art to which the present disclosure pertains without departing from the spirit and scope of the present disclosure.

What is claimed is:

1. An apparatus for collecting a training image of a deep learning model, the apparatus comprising:
a camera sensor configured to capture an image of a surrounding of a vehicle; and
a controller configured to:
determine an entropy of each pixel in the image,
determine an entropy of each class in the image based on the entropy of each pixel in the image, and
determine whether to collect the image based on the entropy of each class,
wherein the controller is configured to:
determine pixels constituting a first class in the image; and
determine, as entropy of the first class, an entropy average of the pixels constituting the first class.

2. The apparatus of claim 1, wherein the controller is configured to:
collect the image as the training image of the deep learning model when the entropy of each class is within a preset range.

3. The apparatus of claim 2, wherein the controller is configured to:
determine a priority of the training images collected, and store a preset number of training images in a storage based on the priority.

4. The apparatus of claim 3, wherein the controller is configured to:
determine the entropy average of each class included in each training image, and
assign a highest priority to a training image having a highest entropy average.

5. The apparatus of claim 3, wherein the controller is configured to:
determine an entropy of a specific class among classes included in each training image, and
assign a highest priority to a training image having a highest entropy of the specific class.

6. The apparatus of claim 3, wherein the controller is configured to:
determine, when the training images are additionally collected in a state that the preset number of training images are stored in the storage, the preset number of training images in a higher priority order with respect to the training images stored and the training images additionally collected.

7. The apparatus of claim 6, wherein the controller is configured to:
substitute the preset number of training images stored in the storage with the preset number of training images determined.

8. The apparatus of claim 3, wherein the controller is configured to:
periodically transmit, to a wireless communication device in a start-off state of the vehicle, the training images stored in the storage.

9. The apparatus of claim 8, wherein the controller is configured to:
transmit, to the wireless communication device in a start-on state of the vehicle, a message for requesting to prepare for receiving the training images, and
receive, from the wireless communication device in the start-off state of the vehicle, a message for indicating that preparing for receiving the training images is completed.

10. A method for collecting a training image of a deep learning model, the method comprising:
taking, by a camera sensor, an image of a surrounding of a vehicle;
determining, by a controller, an entropy of each pixel in the image;
determining, by the controller, an entropy of each class in the image based on the entropy of each pixel in the image; and
determining, by the controller, whether to collect the image based on the entropy of each class,
wherein determining the entropy of the class in the image includes:
determining, by the controller, pixels constituting a first class in the image, and
determining, by the controller, as entropy of the first class, an entropy average of pixels constituting the first class.

11. The method of claim 10, wherein determining whether to collect the image includes:

collecting, by the controller, the image as the training image of the deep learning model when all entropy of each class satisfies a preset range.

12. The method of claim 11, wherein determining whether to collect the image further includes:
   determining, by the controller, a priority of the training images collected, and
   storing, by the controller, a preset number of training images in a storage based on the priority.

13. The method of claim 12, wherein determining the priority of the training images collected include:
   determining, by the controller, the entropy average of each class included in each training image, and
   assigning, by the controller, a highest priority to a training image having a highest entropy average.

14. The method of claim 12, wherein determining the priority of the training images collected includes:
   determining, by the controller, an entropy of a specific class among classes included in each training image, and
   assigning, by the controller, a highest priority to a training image having a highest entropy of the specific class.

15. The method of claim 12, wherein storing the preset number of the training images further includes:
   determining, by the controller, when the training images are additionally collected in a state that the preset number of the training images are stored in the storage, the preset number of training images in a higher priority order with respect to the training images stored and the training images additionally collected, and
   substituting, by the controller, the preset number of training images stored in the storage with the preset number of training images determined.

16. The method of claim 12, wherein determining whether to collect the image further includes:
   transmitting, by the controller to a wireless communication device in a start-on state of the vehicle, a message for requesting to prepare for receiving the training images;
   receiving, by the controller from the wireless communication device, in a start-off state of the vehicle, a message for indicating that preparing for receiving the training images is completed; and
   periodically transmitting, by the controller to the wireless communication device in the start-off state of the vehicle, the training images stored in the storage.

* * * * *